Feb. 25, 1941. G. P. DAIGER 2,232,773
ARMATURE CONSTRUCTION
Filed Dec. 29, 1938

INVENTOR
George P. Daiger
BY
Harry S. Demarest
ATTORNEY

Patented Feb. 25, 1941

2,232,773

UNITED STATES PATENT OFFICE 2,232,773

ARMATURE CONSTRUCTION

George P. Daiger, Canton, Ohio, assignor to The Hoover Company, North Canton, Ohio, a corporation of Ohio Application December 29, 1938, Serial No. 248,277

6 Claims. (Cl. 171—206)

The present invention relates to armatures for electrical machines and particularly to new and improved fillers for armature winding slots. More specifically the invention comprises an improved slot filler for armatures and which is characterized in that the slot filler also includes means to receive a weight for balancing the armature.

It is an object of the invention to provide a new and improved armature. Another object is to provide a filler for armature slots which lies flush with the periphery of the armature. A further object is to provide means in the slot filler to receive a weight for balancing the armature. A still further object is to provide a method of balancing an armature. Further objects and advantages of the invention will be apparent upon referring to the following specification and claims and the attached drawing, wherein:

Figure 1:
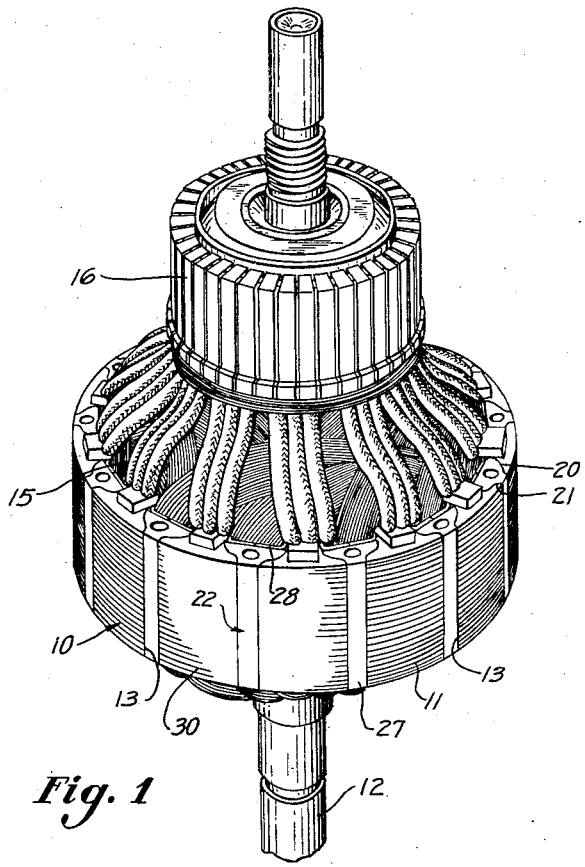
Figure 1 is a perspective view of an armature provided with my winding slot fillers.
Figure 3:
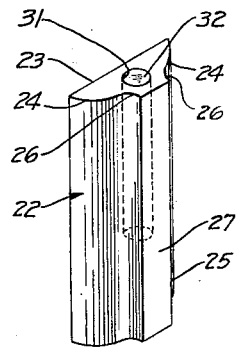
Figure 3 is a perspective view of the winding slot filler embodied in Figures 1 and 2, and Figures 4 and 5 are perspective views of different embodiments of winding slot fillers.
Figure 2:
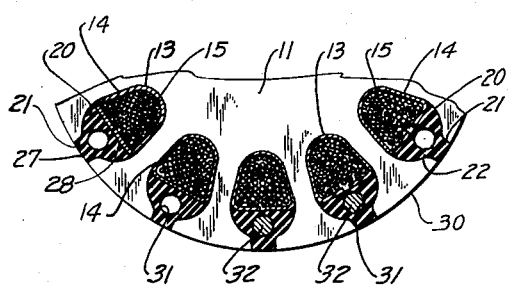
Figure 2 is a section showing the arrangement of the slot fillers and balancing weights in an armature.

One embodiment of the invention is disclosed in Figures 1 through 3 and comprises an armature 10 having a core composed of a plurality of laminae 11. The laminations are mounted on a shaft 12 and are provided with spaced annularly arranged winding slots 13 each provided with a slot liner 14 for the reception of windings 15 which extend about the armature core and are connected to the commutator segments 16. Each winding slot has an enlarged portion 20 merging with a marginal entrance slot 21 through which the windings are inserted into the winding openings 20 to wind the armature core.

A slot filler 22, as shown in detail in Figure 3, is arranged in each of the winding slots 13 and extends throughout the longitudinal length of the latter. Each slot filler 22 has a flat bottom wall 23 and inwardly upwardly curved side walls 24, 24 terminating in a projection 25 having flat vertical side walls 26, 26 and a flat top wall 27.

In order to facilitate the operation of balancing the armatures the fillers 22 are provided with central bores or openings 31 for the driving reception of a suitable balance weight 32 wherever needed. The fillers 22 may be formed of wood or of extruded material provided with a longitudinally extending bore to receive the balance weights 32.

The fillers 22 are slidably inserted in the winding slots 13, the bottom walls 23 resting on the bent-over portions 28 of the slot liners 14 and the curved walls 24 intimately engaging the walls of the slots to maintain the windings in position against the centrifugal force developed when the armature is rotated. The elongated rectangular portions 25 snugly engage the side walls of the entrance slots 21 to prevent entrance of foreign matter into the winding slots, and the top walls 27 of the fillers 22 are disposed flush with the outer periphery 30 of the laminations 11 to reduce the windage noise developed when the armature is rotated. After the fillers 22 are inserted in the winding slots the weights 32 are driven into the openings 31 wherever needed to properly balance the armature.

Figure 4:
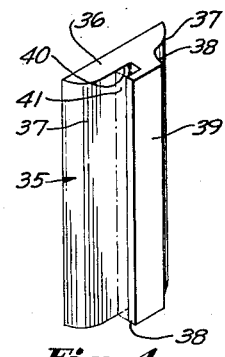

Another embodiment of the invention is shown in Figure 4 and comprises a filler 35 having a flat bottom wall 36, inwardly upwardly curved side walls 37, 37 which conform to the contour of the winding slots, and vertical side walls 38, 38 terminating in a flat top wall 39. The filler 35 is inserted in the winding slots of the rotor in the same manner as already described.

In this modification an elongated open ended recess 40 extends along a side wall 38 of the slot filler 35 and is provided with an elongated open mouth 41 which is closed by a defining wall of the narrow entrance 21 to the winding slot 13. In order to balance the armature suitable weights are driven into the openings 40 defined by the wall of the narrow slots 21 and the slot fillers 35 wherever required.

Figure 5:
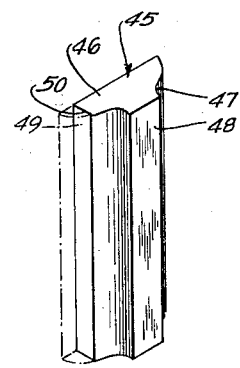

A further modification of the invention is shown in Figure 5 and comprises a filler 45 having a base 46 and a projection 47. The filler is driven longitudinally in the winding slots of the armature as hereinbefore described, the top wall 48 of the projection 47 lying flush with the periphery 30 of the armature.

The base 46 of the filler 45 is so constructed with respect to the winding slot 13 that when the projection 47 positions the filler in a winding slot a vacant space 49 will be provided between the side 50 of the filler and the adjacent defining wall of the winding slot 13. Suitable weights may be driven into the balancing openings 49 where needed to properly balance the armature.

From the foregoing it will be perceived that I have provided a winding slot filler which not only reduces windage noise and maintains the windings in the slot when the armature is rotated, but also have provided means in the fillers, or means in the fillers cooperating with a defining wall of the winding slots, to form openings into which weights may be driven in order to balance the armature.

It is to be understood that the protection herein applied for is not confined to the particular combinations of features or elements set out in the following claims. Protection is herein applied for, for any one or more of the features or elements referred to in the following claims, or described in the foregoing specification or shown in the accompanying drawing, either independently or in combination.

I claim:

1. An armature having a core provided with marginal winding slots along its periphery, windings wound about said core and in said slots, fillers in said slots between said windings and the periphery of said core, said fillers lying flush with the periphery of said core, and means in said fillers defining openings to receive weights driven therein for balancing the armature.

2. An armature having a core provided with marginal winding slots, windings wound about said core and in said slots, fillers in said slots for holding said windings therein, and means in said fillers defining annular openings to receive weights driven therein for balancing the armature.

3. An armature having a core provided with marginal winding slots, windings wound about said core and in said slots, fillers in said slots for holding said windings therein, and means along an edge of said fillers cooperating with the defining edges of said slots to provide openings for the reception of weights to balance the armature.

4. An armature having a core provided with marginal winding slots, windings wound about said core and in said slots, and fillers in said slots and having an enlarged base and reduced top portion to conform to the contour of said slots for holding said windings therein, a portion of said filler base being spaced from the defining wall of said winding slots to provide openings for the reception of weights to balance the armature.

5. An armature slot filler comprising an elongated member adapted to be inserted in the winding slot of an armature to completely close said slot, and means in said elongated member defining an opening for receiving a weight driven therein to balance the armature.

6. An armature slot filler, comprising an elongated member of electric insulating material adapted to be inserted in an armature winding slot, and means in said elongated member defining an opening for receiving a weight driven therein to balance the armature.

GEORGE P. DAIGER.